C. D. WILLIAMS.
CONVERTIBLE AUTOMOBILE BODY.
APPLICATION FILED APR. 15, 1914.
1,151,314.
Patented Aug. 24, 1915.
2 SHEETS—SHEET 1.
Fig. 1.
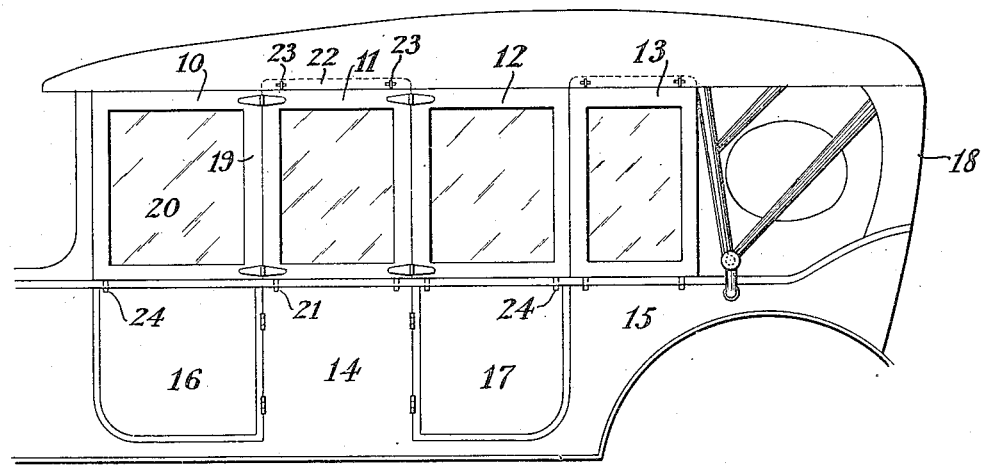
Fig. 2.
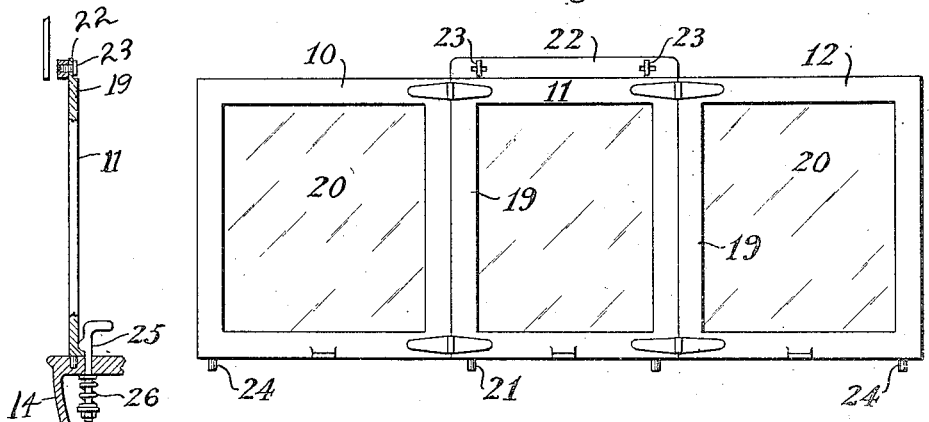
Fig. 3.
Witnesses:
E. Coltran
Leonora R. Nicholsburg
Inventor
Chas. D. Williams
By his Attorney

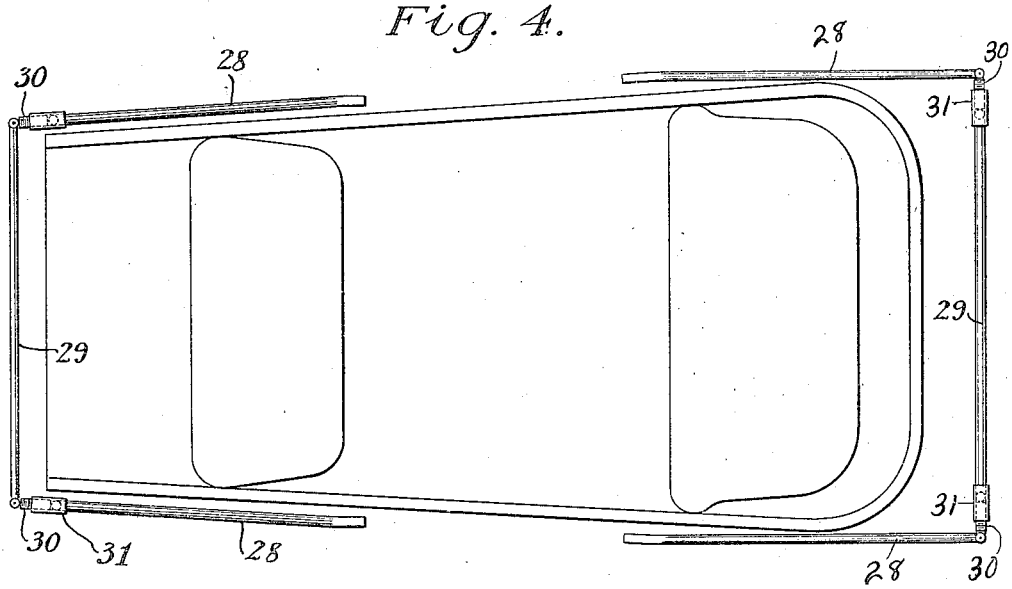
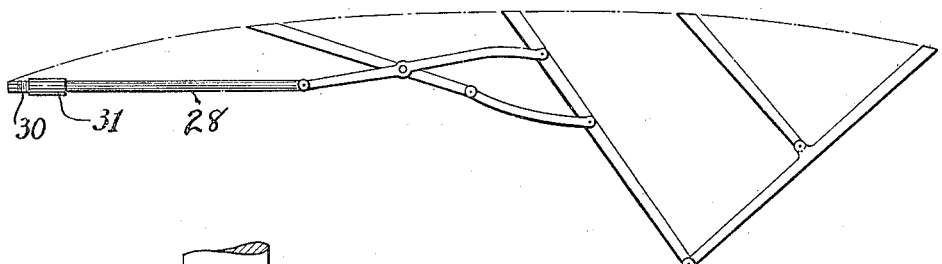
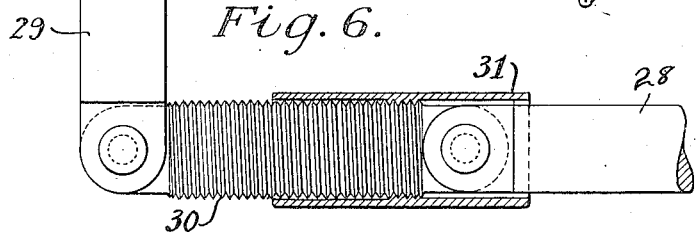
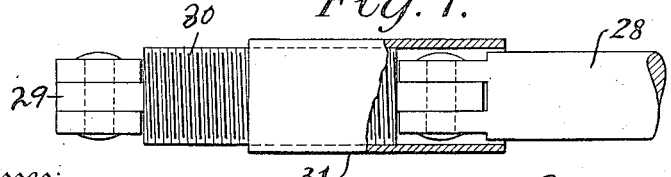

UNITED STATES PATENT OFFICE.

CHARLES D. WILLIAMS, OF NEW YORK, N. Y.

CONVERTIBLE AUTOMOBILE-BODY.

1,151,314.    Specification of Letters Patent.    Patented Aug. 24, 1915.

Application filed April 15, 1914. Serial No. 831,906.

*To all whom it may concern:*

Be it known that I, CHARLES D. WILLIAMS, a citizen of the United States, and resident of New York city, borough of Manhattan, in the county of New York and State of New York, have invented certain new and useful Improvements in Convertible Automobile-Bodies, of which the following is a specification.

The main object of my invention is to more readily enable an open vehicle body to be converted into a closed one.

My invention is particularly applicable to automobile bodies and enables the owner to have all of the advantages of a touring car or a limousine with only a single body.

A further object of my invention is to facilitate the proper supporting of the detachable side wall sections from the automobile top in such cases where the body itself tapers from the back end toward the front.

My improved top which also forms an important part of my invention and which may be employed independently of the side wall sections, is so formed that it may taper from the back toward the front to correspond with the taper of the body itself, but the front may be widened out to facilitate the proper folding of the top when the latter is moved rearwardly and downwardly.

Reference is to be had to the accompanying drawings, in which similar characters of reference indicate corresponding parts throughout the several views, and in which:

Figure 1 is a side elevation of a vehicle body having the top and side walls constructed in accordance with my invention; Fig. 2 is a side elevation of the main detachable side wall sections; Fig. 3 is a vertical section showing the side wall in position; Fig. 4 is a top plan view of an automobile body and showing a portion of the frame of the top in front and rear positions; Fig. 5 is a side elevation of a portion of the frame of the top; and Figs. 6 and 7 are details showing the front corner construction of the top frame.

The side walls when constructed in accordance with my invention include a plurality of sections 10, 11, 12 and 13 the number of sections of course depending upon the character of the automobile body in connection with which my invention is employed. Where the main body includes wall sections 14 and 15 and front and rear doors 16 and 17, there would be four sections of my detachable wall, the sections 10 and 12 corresponding in width to the width of the doors 16 and 17, and the section 11 corresponding in width to the body wall section 14 between the front and rear doors. The rear section 13 of my detachable wall may vary in width dependent upon the extent to which the usual side curtains 18 extend forwardly from the rear.

Each of the four sections includes a rigid frame 19 of wood, metal or other suitable material, and a central, transparent portion or panel which may be of glass, celluloid, or other suitable material. I have not illustrated the details of this frame, and the means for securing the transparent portions in place as any suitable well-known construction may be employed.

As one important feature of my invention I hinge the separate sections of the detachable wall together, so that they will bear certain predetermined relationships to each other, and will have only a predetermined relative movement. Where the front door of the automobile swings about hinges at the rear edge of the door, and where the rear door swings about hinges at the front edge of the rear door as in the specific construction illustrated in Fig. 1, I hinge the sections 10 and 12, which are above the two doors and which constitute detachable extensions of the latter, to the wall section 11, which extends upwardly from and forms an extension of the body wall portion 14. Thus, the sections 10, 11 and 12 are hinged in series, and each serves to aid in the supporting of the others.

To hold the three sections in place, the middle section 11 has pins 21 extending into sockets in the upper edge of the wall portion 14, and at its upper edge, it has a flange or flap 22, adapted to be buttoned or otherwise detachably secured to the top. As illustrated, I employ two buttons 23 of oblong form adapted to extend through oblong slots and turn through 90 degrees to hold the parts together. With the wall section 11 thus held in place, the wall sections 10 and 12 which are disposed above the two doors, may swing in respect to this central section 11. They may swing independently of the doors or may be detachably secured to the latter, so as to swing with the doors. If the hinges connecting the sections are in direct alinement with the hinges of the main doors, then the sections 10 and 12, adjacent their free edges may have pins 24, adapted to extend into sockets in the upper edges of the doors 16 and 17. Any other form of clamping means may be employed for holding a main door to its door extension and insure the simultaneous swinging of the two. With the doors mounted as in Fig. 1, the rear wall section 13 might be held in position in exactly the same way as the section 11. If the rear door 17 of the vehicle be mounted to swing about hinges at its rear edge then the section 12 would of course be hinged to the section 13, instead of to the section 11. For preventing rattling and to avoid undue movement of the sections in respect to the body, itself during the jarring or shaking of the top, the sections may be provided with fastening means as shown in Fig. 3. Links 25 may be hooked to the lower edge of the frame and may have springs 26 pulling downwardly on the links, so as to effectively hold the frames in position.

In order to render the construction above described useful for vehicle bodies which are narrower at the front end than at the rear, I so form the top that it will also taper from the rear toward the front, so as to approximately correspond to the taper of the body. Thus the edges of the top will be directly above the edges of the body of the car, and permit the desired registry of the wall sections. In Fig. 5, I have shown a side elevation of the frame portion of a vehicle top with my improvement applied thereto. I wish it specifically understood that I do not claim any invention in this frame except in regard to the adjustment of the width of the front end thereof, and that any other suitable form of frame may be employed in place of that illustrated. In order to permit the top to fold down over the rear seat it is necessary that the front portion of the top be of a width slightly greater than the width of the rear seat, and this is not possible in ordinary constructions, if the front end of the top be made of a width corresponding to the front portion of the body. To permit of this variation in width, I connect the side members 28 of the top frame to the front member 29 of the top frame by links 30 pivoted at each end. Any suitable form of joint may be employed for pivotally connecting the links 30 both to the side members 28 and the front member 30, but preferably I employ such a form of hinge as will permit a swinging only in one plane. In connection with the link, I employ means for rigidly locking the link to either the side member or the front member to prevent its movement in respect thereto. Such means preferably takes the form of a sleeve 31 threaded on the link 30, so as to move endwise and encircle and inclose the hinge or joint at either end of the link. The combined length of the two links 30 is substantially equal to the desired variation between the front and rear ends of the top. With the top raised the links would be disposed in alinement with the side members 28 of the frame, and the sleeves would hold them in this position as shown at the left hand end of Fig. 4. With the top folded back the sleeves may be screwed endwise to uncover one joint or hinge and cover the other and the links would then be held in alinement with the front frame member 29, as shown at the right hand end of Fig. 4. Thus, the top may have its front portion narrower than its rear portion when raised, but may have the front portion spread out to the same width as the rear portion to permit the proper folding of the top down past the edges of the rear seat.

Although this construction of top may be employed in connection with any suitable automobile body, irrespective of whether or not the latter be provided with detachable sections for converting an open into a closed top, yet this top has a special utility when used in connection with the detachable wall sections above described. The wall sections may extend vertically from the body and will properly register with the top even though the body be narrower at the front end than it is at the rear end.

Having thus described my invention, what I claim as new and desire to protect by Letters-Patent, is:

1. A vehicle having a body portion of greater width at its rear end than at its front end, a foldable top carried by said body and having its side edges converging toward said front end, and a plurality of wall sections adapted to close the space between the upper edges of said body and said top, said wall sections being detachable, and said top having its front edge laterally extendible to a width substantially equal to the width of the rear end when said panels are removed and said top is folded back.

2. A vehicle body having the upper edges of its opposite sides substantially straight and tapering from the rear end to the forward end, a vehicle top having its side edges substantially straight and tapering from the rear end to the forward end, the taper of the body corresponding to the taper of the top, said top being foldable into compact position adjacent to the rear of said body, and the front end of said top being extensible to a width substantially equal to the width of the rear end when said top is in folded position.

3. A vehicle top having a frame including side members, and a front member, links connecting said side member and said front member, and means for holding said links rigid with either said side members or said front members.

4. A vehicle top having side frame members, a front frame member, and two links, each having one end pivoted to a corresponding side member and one end pivoted to said front member and sleeves on said links and movable lengthwise in respect thereto to encircle the pivotal connection at either end of said links to retain said links in alinement with said front frame member or in alinement with said side frame members.

5. A vehicle top having a frame including side members, a front member, and connections between said side members and said front member and permitting a variation in the effective length of said side members with a corresponding and inverse variation in the effective length of said front member.

6. A vehicle top having a frame including side members, a front member, and means for simultaneously increasing the effective length of said side members and decreasing to a corresponding extent the effective length of said front member.

7. A vehicle top having a frame including side members, a front member, links connecting said side members and said front member, and means for holding said links substantially in alinement with said side members or with said front member.

Signed at New York city in the county of New York, and State of New York, this 6th day of April, A. D. 1914.

CHARLES D. WILLIAMS.

Witnesses:
  CLAIR W. FAIRBANK,
  FLORENCE LEVIEN.

Copies of this patent may be obtained for five cents each, by addressing the "Commissioner of Patents, Washington, D. C."